Patented Nov. 4, 1941

2,261,400

UNITED STATES PATENT OFFICE 2,261,400

CLAY REFRACTORY

John D. Morgan, South Orange, N. J., assignor to Cities Service Oil Company, New York, N. Y., a corporation of Pennsylvania No Drawing. Application July 30, 1938, Serial No. 222,219

8 Claims. (Cl. 106—57)

This invention relates to the manufacture of clay and porcelain refractories particularly suitable for use as electrical porcelains.

In the making of clay and porcelain refractories, one of the problems confronting manufacturers, is the trouble and expense involved in the drying of the wet clay mixtures used for making the refractories. Heretofore it has been found necessary to carefully dry the wet clay mixture in a heated atmosphere for as much as several weeks, and even under such conditions the products resulting from the operation are friable and weak.

The primary object therefore of the present invention is to provide an improved method of manufacturing clay and porcelain refractories which will materially reduce the preliminary drying time and expense.

Another object of the invention is to provide improved clay and porcelain refractories adapted for use in a wide and varied field.

According to the improvement in the manufacture of clay and porcelain refractories, the present invention involves the discovery that phosphoric acid acts to dehydrate wet clay mixtures and when combined with the use of chromium salts, a finished refractory may be obtained at relatively low bonding temperatures.

Further features, objects and advantages of the present invention will be apparent to those skilled in the art from the following more detailed description.

For example, a mixture of aged and ground clays comprising the following ingredients is first made: 30 parts by weight of flint; 30 parts by weight of talc; 35 parts by weight of Georgia clay; and 5 parts by weight of a domestic ball clay. Sufficient water is added to wet the mixture after which about 4 parts by weight of (85%) phosphoric acid calculated at $P_2O_5$, and about 2 parts by weight of chromic acid (crystalline), calculated as $Cr_2O_3$ are mixed into the clay mixture. The ingredients in the mixture are thoroughly mixed and digested at ordinary room temperature or in a drying oven maintained at a temperature slightly below the boiling point of water for a period of time sufficient to substantially dry the mixture.

After the digested mixture has been reduced to a dryness sufficient for disintegration, the mixture is broken up for example by regrinding, to a convenient size for moulding. The resulting mixture is tempered with water and moulded by hand ramming or under hydraulic or mechanical pressure into the desired shape or shapes. The moulded shapes are slowly dried for a few hours at a temperature of from about 125° to 200° F. and then their temperature is gradually raised to from 250 to 600° F. in a period of about two to three hours. At this temperature a hard usable product is obtained. If however a finished product is desired that is capable of submergence in water for a considerable period of time without deleterious effects, the temperature of the final firing should be about 1200° F. The effect of such firing at about 1200° F. will be to produce a finished refractory shape which is exceedingly hard and firm and will satisfactorily withstand water immersion. The practice of the features of the invention materially cuts down the drying and firing time of clay refractories. The use of the phosphoric and chromic acids assists in the dehydration of the clays and appears to catalyze the transformation of the silicates originally present in the clay to a stable form of quartz and provides a highly efficient low temperature bond for the refractory product.

The improved clay products of the present invention may be made by a process somewhat simpler than that described in the above example, that is, by mixing a clay or clays of known moisture content with a mixture comprising the required amount of water, sufficient phosphoric acid or equivalent to provide about 6% by weight of the clay and about ¼ of 1% of chromic acid by weight of the clay. The clay and water solution is thoroughly mixed and kneaded until the clay has acquired the proper consistency for casting into the shapes.

In the manufacture of clay refractories as described in these examples, it appears that the concentrated phosphoric acid and also the chromic acid accelerates the drying of the wet clay in the preliminary stage and that the chromium phosphate produced in the mixture aids in the setting of the clay shapes. The chromium phosphate in the clay shapes appears to accelerate the removal of combined water at relatively low temperatures in the preliminary firing or drying of the shapes so that the shapes are very stably set by the time they have been dried to a temperature of about 250° F. In prior operations, temperatures as high as 900° F. have been required to remove the combined water from the clay.

While in the particular example the proportion of phosphoric acid is given as about 4% by weight of the mixture (dry) it is within the scope of this invention to use as little as about 1% and as much as 12% by weight of phosphoric acid (as $P_2O_5$).

Phosphorus pentoxide may be used in the mixture in the place of phosphoric acid, and this material may be provided in the clay mixture by using a suitable refractory metal phosphate, such as chromic phosphate, and a mineral acid capable of converting the phosphate into sufficient phosphoric acid to effect the bonding of the clay particles.

As little as about one fourth of one per cent of chromic acid in terms of $Cr_2O_3$ may be used in the mixture, but for practical purposes, at least four times this much should be used, but in no case more than 6%. Where phosphoric acid is used, the chromium content of the mixture can be supplied by using certain chromium salts such as the chloride, sulfate, or nitrate. Chromic phosphate and a mineral acid may be used to supply both the phosphoric acid and the chromium content for the mixture. In the manufacture of clay refractories in accordance with the features of the present invention, it has been found that the products may be greatly improved by adding from 3% to 15% of zircon to the initial clay mixture prior to the treatment of the same with acids. The added zircon is preferably previously milled to approximately 300 mesh.

The refractory products made in accordance with features of the present invention are extremely hard and may be made to take a high polish either by grinding or pressing at high pressures. The refractories will be found suitable for many special applications in the arts, in addition to their suitability as electrical porcelains.

Having thus described the invention in its preferred form, what is claimed as new is:

1. The method of bonding clay particles to form a refractory body comprising mixing ground clay with 4-6 parts by weight of phosphoric and 1-2 parts chromic acids, digesting the mixture, drying the digested mass, bringing it to the desired consistency for moulding, moulding it into the desired shapes, and heating the shapes to a temperature of about 600° F.

2. A refractory product comprising clay and zircon bonded by the reaction products thereof with about 4-6 parts by weight of the mixture of phosphoric acid and 1-2 parts by weight of chromic acid, said zircon comprising from 3% to 15% by weight of the clay-zircon mixture.

3. A bonded refractory, comprising 30 parts by weight of flint, 30 parts by weight of talc, 35 parts by weight of Georgia clay, 5 parts by weight of a domestic ball clay, and 9 parts by weight of zircon bonded by the reaction products thereof with about four parts by weight of phosphoric acid and about two parts by weight of chromic acid at a relatively low bonding temperature.

4. A refractory clay product, comprising clay particles bonded together by the reaction products thereof with about ¼%-2% by weight of the mixture of chromic acid and about 4%-6% by weight of phosphoric acid.

5. In the method of making clay refractories, the improvement which comprises mixing clay particles with from ¼%-2% by weight of chromic acid and 4%-6% by weight of phosphoric acid in terms of $P_2O_5$ as a bonding agent and water to form a wet mixture, digesting the mixture at a relatively low temperature, and simultaneously effecting a substantially rapid drying thereof.

6. In the method of making clay refractories, the improvement in the preliminary drying of wet clay mixtures to be converted into refractories, which comprises mixing the wet clay mixture with 1%-12% by weight of concentrated phosphoric acid and ¼%-6% by weight of chromic acid, and digesting the resulting mixture.

7. A refractory clay product comprising clay particles bonded together by the reaction products thereof with 1%-12% by weight of phosphoric acid and ¼%-6% by weight of chromic acid.

8. In the method of making clay refractories, the improvement in the preliminary handling of wet clay mixtures to be converted into refractories, which comprises mixing the wet clay mixture with salts of chromium and a refractory metal phosphate together with a mineral acid in amounts proportioned to provide a bonding equivalent of 4-6 parts phosphoric acid and 1-2 parts chromic acid.

JOHN D. MORGAN.